(12) United States Patent
Takahashi et al.

(10) Patent No.: US 9,884,445 B2
(45) Date of Patent: Feb. 6, 2018

(54) PREFORM HEATING APPARATUS

(71) Applicant: NISSEI ASB MACHINE CO., LTD., Nagano (JP)

(72) Inventors: Tsuyoshi Takahashi, Nagano (JP); Shuichi Ogihara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 210 days.

(21) Appl. No.: 14/901,452

(22) PCT Filed: Jun. 26, 2014

(86) PCT No.: PCT/JP2014/067054
§ 371 (c)(1),
(2) Date: Dec. 28, 2015

(87) PCT Pub. No.: WO2014/208693
PCT Pub. Date: Dec. 31, 2014

(65) Prior Publication Data
US 2016/0368197 A1    Dec. 22, 2016

(30) Foreign Application Priority Data
Jun. 28, 2013 (JP) ................. 2013-137346

(51) Int. Cl.
*B29C 49/68* (2006.01)
*B29C 49/42* (2006.01)
(Continued)

(52) U.S. Cl.
CPC .............. *B29C 49/68* (2013.01); *B29C 49/06* (2013.01); *B29C 49/4252* (2013.01);
(Continued)

(58) Field of Classification Search
CPC . B29C 49/6409; B29C 49/6472; B29C 49/68; B29C 49/4205
See application file for complete search history.

(56) References Cited

U.S. PATENT DOCUMENTS 4,606,723 A    8/1986 Pasternicki
6,361,301 B1 *  3/2002 Scaglotti ............ B29C 49/6445
                                              264/454
(Continued)

FOREIGN PATENT DOCUMENTS

CN    1399860 A       2/2003
GB    1357357 A *     6/1974  ........... B29B 13/024
(Continued)

OTHER PUBLICATIONS

Taiwanese Office Action dated Jul. 14, 2016 for Application No. 14901452.
(Continued)

*Primary Examiner* — Robert B Davis
(74) *Attorney, Agent, or Firm* — David L. Hoffman; Hoffman Patent Group

(57) ABSTRACT

A preform heating apparatus has cover members 164 provided to close upper parts of two transport lines arranged in parallel, heating units 162 each having heaters 166 for heating preforms 200, and a first supply section for supplying cooling air into the cover members 164. The heating units 162 are each provided within each cover member 164 on a side between the transport lines. The first supply section introduces cooling air from air delivery spaces 169 provided between the transport lines into the cover members 164 through gaps between the heaters 166 to supply the cooling air toward the preforms 200.

11 Claims, 6 Drawing Sheets

(51) Int. Cl.
  *B29C 49/06* (2006.01)
  *B29D 22/00* (2006.01)
  *B29C 49/64* (2006.01)

(52) U.S. Cl.
  CPC ........ B29D 22/003 (2013.01); *B29C 49/4205* (2013.01); *B29C 49/6409* (2013.01); *B29C 49/6472* (2013.01)

(56) References Cited

U.S. PATENT DOCUMENTS

| | | | |
|---|---|---|---|
| 7,121,821 B2 * | 10/2006 | Pickel | B29C 49/6445 264/458 |
| 8,083,512 B2 * | 12/2011 | Adriansens | A61L 2/04 422/303 |
| 2006/0186582 A1 | 8/2006 | Scheid | |
| 2011/0300497 A1 | 12/2011 | Derrien | |

FOREIGN PATENT DOCUMENTS

| | | | |
|---|---|---|---|
| GB | 2156732 | 10/1985 | |
| JP | 60-214925 | 10/1985 | |
| JP | 4-12212 | 3/1992 | |
| JP | 06255643 | 9/1994 | |
| JP | 11-348106 | 12/1999 | |
| JP | 2004-050604 | 2/2004 | |
| JP | 2012-020574 | 2/2012 | |
| JP | 2012-245753 | 12/2012 | |
| WO | WO-0134369 A1 * | 5/2001 | ......... B29C 49/6409 |
| WO | WO0149075 A1 | 7/2001 | |

OTHER PUBLICATIONS

International Search Report dated Sep. 16, 2014 from PCT/JP2014/067054 (5 pages).

* cited by examiner

PREFORM HEATING APPARATUS

This application is a U.S. national stage application of International Patent Application No. PCT/JP2014/067054, having an international filing date of Jun. 26, 2014, which designated the United States and which claims priority from Japanese Patent Application No. 2013-137346, filed on Jun. 28, 2013, the entirety of both of which are incorporated herein by reference.

TECHNICAL FIELD

This invention relates to a preform heating apparatus which is installed on a blow molding apparatus or the like for blow molding a preform to form a hollow container, and which heats the preform to a temperature at which the preform can be molded.

BACKGROUND ART

A molding device for molding a preform to form a hollow container is generally loaded with a heating device for heating the preform to a temperature at which the preform is moldable. This heating device is provided on a transport line, on which the preform is transported, to heat the preform to a predetermined temperature while transporting it. Such a heating device is equipped with various heaters, such as infrared heaters, and the preform passing through the interior of the device is heated with light (heat) from the heaters, and is also heated with an atmosphere within the device raised in temperature by the heaters.

If the atmosphere within the heating device excessively rises in temperature, however, it may be impossible to heat the preform to an appropriate temperature. For example, even when it is attempted to impart a temperature distribution at different sites in the axial direction of the preform, it is unlikely to provide an appropriate temperature distribution, if the atmosphere within the device is raised in temperature excessively.

Among heating devices for a preform, therefore, there is one which is configured to cool the preform with a cooling wind, and release air within the heating device to the outside, thereby suppressing an excessive temperature rise within the device. For example, a heating device is available which is adapted to cool the preform with cooling air blown from a blow-off port into a heating oven, and which has a wire netting on the top surface (upper part) of the heating oven for letting air in the heating oven escape to the outside of the oven to adjust the temperature within the heating oven (see Patent Document 1). There is another heating device, for example, which is designed to bring the interior of a tunnel, where the preform is transported, to reduced pressure by means of a blower, thereby drawing cooling air into the tunnel and discharging air heated within the tunnel (see Patent Document 2).

By so discharging air within the heated device (inside the heating oven, or inside the tunnel) to the outside, an excessive temperature rise of the atmosphere within the device can be suppressed.

PRIOR ART DOCUMENTS

Patent Documents

Patent Document 1: JP-A-2012-245753
Patent Document 2: JP-B-04-12212

SUMMARY OF THE INVENTION

Problems to be Solved by the Invention

In order to control the temperature of the atmosphere within the device with high accuracy, however, it is necessary to provide many air blowing mechanisms, for example, thus posing the problem that the device must be upsized.

The present invention has been accomplished in light of the above-mentioned circumstances. It is an object of this invention to provide a preform heating apparatus which, in a relatively simple configuration, can efficiently make temperature adjustment of an internal space where a preform is transported.

Means for Solving the Problems

A first aspect of the present invention for solving the above problems lies in a preform heating apparatus for heating preforms transported on a transport line, wherein two of the transport lines are arranged adjacently and in parallel, the preform heating apparatus comprising: cover members provided to close upper parts of the transport lines; heating units provided within the cover members and each having heaters for heating the preforms; and a first supply section for supplying cooling air for cooling the preforms into the cover members, wherein the heating units are each provided within each of the cover members on a side between the transport lines, and the first supply section introduces cooling air from air delivery spaces, which are provided between the transport lines, through gaps between the heaters into the cover members to supply the cooling air toward the preforms.

A second aspect of the present invention is the preform heating apparatus according to the first aspect, wherein the cover member is provided with a first opening which is provided opposite the heaters and into which cooling air heading for a barrel of the preform is introduced, and a second opening which is provided independently of the first opening and into which cooling air heading for a neck of the preform is introduced.

A third aspect of the present invention is the preform heating apparatus according to the second aspect, wherein a discharge passage is provided opposite the first opening, and a second discharge passage independent of the discharge passage is provided opposite the second opening.

A fourth aspect of the present invention is the preform heating apparatus according to any one of the first to third aspects, further comprising a second supply section for supplying warm air to upper spaces of the cover members.

A fifth aspect of the present invention is the preform heating apparatus according to the fourth aspect, wherein the second supply section recovers the cooling air supplied by the first supply section into the cover members, and resupplies the cooling air to the upper spaces of the cover members.

A sixth aspect of the present invention is the preform heating apparatus according to the fourth or fifth aspect, wherein the second supply section supplies the warm air into the cover members along the transport lines.

A seventh aspect of the present invention is the preform heating apparatus according to any one of the fourth to sixth aspects, wherein the cover member is supplied with the warm air from one end side of the cover member, the warm air is discharged from another end side of the cover member, and an exhaust portion having an opening at a top thereof and discharging the warm air, which has been discharged from the cover member, to the outside through the opening is connected to the other end side of the cover member.

Effects of the Invention

According to the preform heating apparatus of the present invention, temperature adjustment of the internal space where the preform is transported can be made efficiently using a relatively simple configuration. Particularly, because of a configuration in which cooling air supplied to the interior of the cover member is recovered and resupplied to the upper space of the cover member, the preform can be heated efficiently.

MODE FOR CARRYING OUT THE INVENTION

Embodiments of the present invention will now be described in detail with reference to the accompanying drawings.

Embodiment 1

Figure 1:
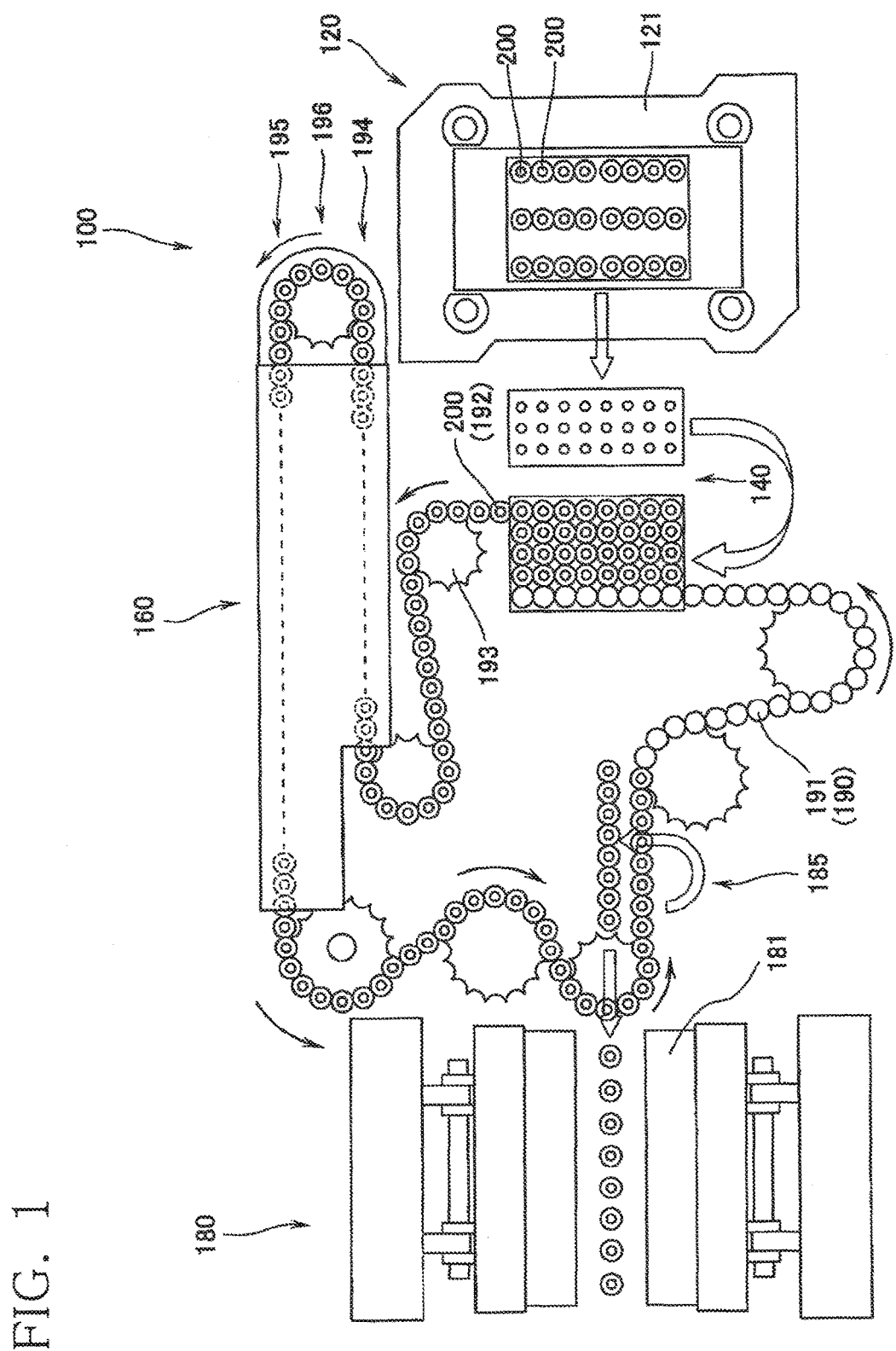
FIG. 1 is a schematic view showing a molding apparatus equipped with a heating apparatus according to Embodiment 1 of the present invention.
Figure 2:
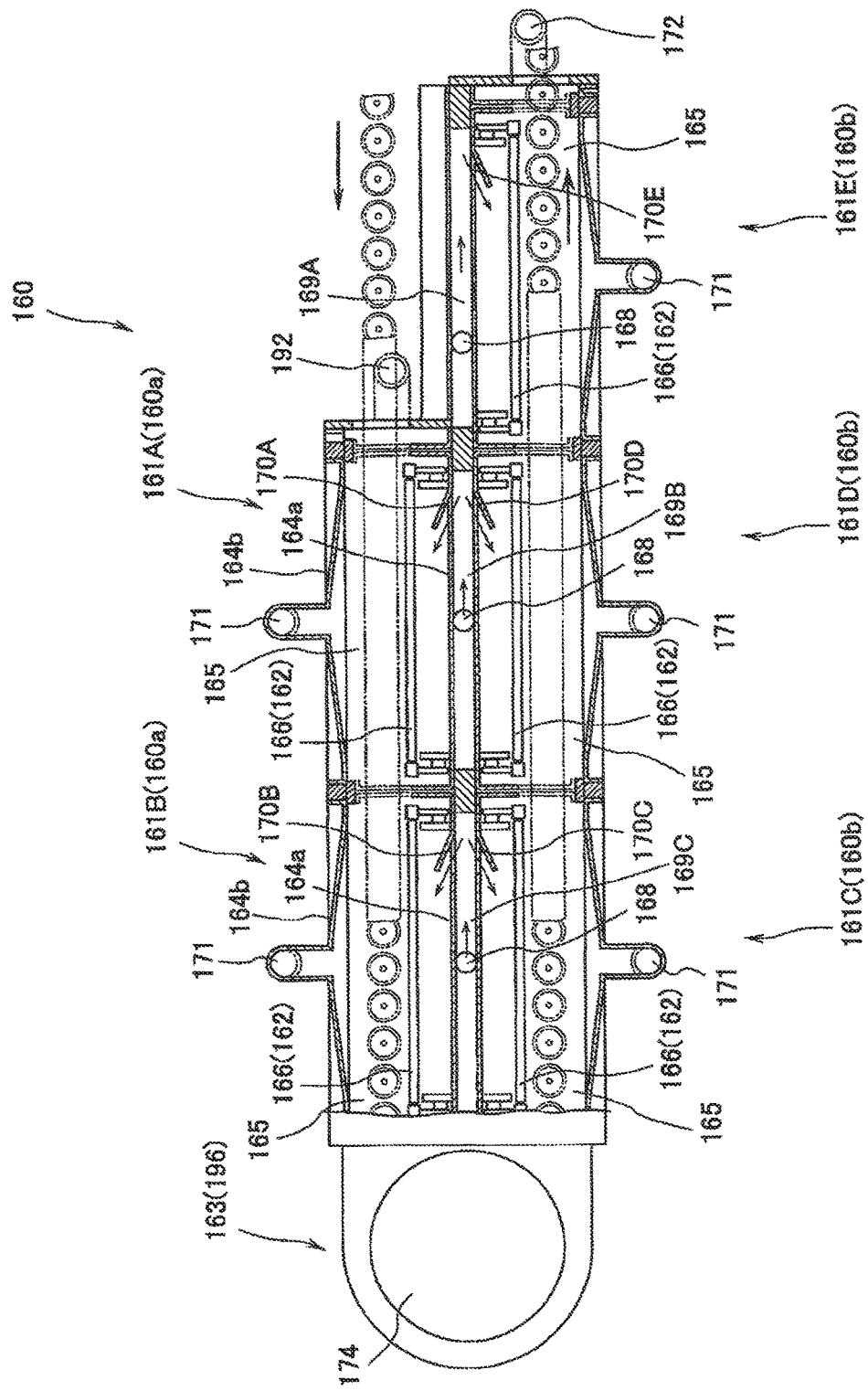
FIG. 2 is a plan view showing the heating apparatus according to Embodiment 1 of the present invention.

As shown in FIG. 1, an injection molding apparatus 100 according to the present embodiment is equipped with an injection molding section 120 for injection molding preforms 200 (see FIG. 4); a cooling section 140 for cooling the preforms 200 molded in the injection molding section 120; a heating section (heating apparatus) 160 for heating the preforms 200; and a blow molding section 180 for blow molding the preforms 200 arranged within blow cavity molds.

The injection molding apparatus 100 is also equipped with a transport section 190 including a loop-shaped transport line 191 circulating from the cooling section 140 through the heating section 160 to the blow molding section 180. The transport section 150 transports the preforms 200 from the cooling section 140 to the heating section 160 on the transport line 191, and also transports the preforms 200, which have been heated in the heating section 160, to the blow molding section 180.

The present invention is characterized by the configuration of the heating section (heating apparatus) 160 provided in the injection molding apparatus 100. Since the configurations of the other sections, such as the injection molding section 120, the cooling section 140, and the blow molding section 180, are publicly known, they will be described briefly herein. (If necessary, reference is requested to WO2013/027692, the international publication by the present applicant.)

The injection molding section 120 is equipped with a mold clamping mechanism 121, and clamps a core mold disposed above and a cavity mold disposed below by the mold clamping mechanism 121, although their illustrations are omitted. In the injection molding section 120, an injection space defined by the core mold and the cavity mold is charged with a resin material (raw material) by an injection device, whereby the preform 200 is injection molded. In the injection molding section 120 according to the present embodiment, up to 24 (3 rows×8/row) of the preforms 200 can be molded simultaneously.

The cooling section 140 forcibly cools the injection molded preforms 200. The preforms 200 injection molded in the injection molding section 120 are transported from the injection molding section 120 to the cooling section 140 by a transport device (not shown), and forcedly cooled in the cooling section 140. The preforms 200 cooled to a predetermined temperature in the cooling section 140 are carried out into the transport line 191 constituting the transport section 190, and transported continuously.

The preforms 200 are molded in an upright state with the neck facing upward in the injection molding section 120 and, in this state, are transported from the injection molding section 120 to the cooling section 140. The cooling section 140 has an inversion mechanism (not shown) for inverting the preforms 200, which have been transported in such an upright state, to bring them into an inverted state with the neck facing downward. During cooling in the cooling section 140, the preforms 200 are inverted by this inversion mechanism to enter an inverted state, and held by transport jigs 192 provided in the transport section 190.

The transport line 191 is constituted such that a plurality of the transport jigs 192 are transported continuously and sequentially by the driving force of a sprocket 193, etc. The transport jigs 192 are arranged in a plurality of rows below the cooling section 140, and the transport jigs 192 holding the preforms 200 are sequentially carried out into the transport line 191. Then, the preforms 200 held by the transport jigs 192 are transported along the transport line 191 and carried into the heating section (heating apparatus) 160.

In the heating section (heating apparatus) 160, the preforms 200 held by the transport jigs 192 are heated to a temperature suitable for stretching while being moved along the transport line 191. The transport section 190 is configured such that the transport jigs 192 move while rotating on their own axes on the transport line 191. That is, within the heating section 160, the preforms 200 are heated while being allowed to rotate on their own axes. By so doing, in the heating section 160, the preforms 200 can each be heated to a nearly uniform temperature over the entire periphery thereof.

Here, a section of the transport line 191, where the heating section 160 is provided, is composed of a first straight portion 194 for transporting the transport jigs 192 rectilinearly in a first direction (upward in the drawing), a second straight portion 195 for transporting the transport jigs 192 rectilinearly in a direction opposite to the first direction (i.e., downward in the drawing), and a curved portion 196 formed in a nearly arcuate shape for connecting the first straight portion 194 and the second straight portion 195 (see FIG. 1). That is, the first straight portion 194 and the second straight portion 195 constituting the transport line 191 are provided in two lines adjacent to each other.

The heating section 160 is equipped with a plurality of (five) heating boxes 161 (161A to 161E) which are provided in correspondence with the first straight portion 194 and the second straight portion 195 and in which heating units 162 are accommodated. The plurality of heating boxes 161, in the present embodiment, are arranged in two rows. Concretely, the first and second heating boxes 161A, 161B are arranged side by side in the first straight portion 194 to constitute a first heating section 160a, while the third to fifth heating boxes 161C, 161D, 161E are arranged in parallel in the second straight portion 195 to constitute a second heating section 160b. The heating section 160 also has an exhaust portion 163 provided at a position corresponding to the curved portion 196, and the second heating box 161B of the first heating section 160a and the third heating box 161C of the second heating section 160b are connected together via the exhaust portion 163.

As shown in FIGS. 2 to 5, the heating boxes 161 (161A to 161E) have cover members 164 provided to cover at least three surfaces, namely, both side surfaces sandwiching the transport line 191, and the upper surface opposing the transport line 191. That is, a transport space 165 for transport of the preform 200 is defined by the cover member 164. The heating unit 162 is accommodated within the cover member 164. In the present embodiment, for example, the heating units 162 are installed between the constituent lines of the transport line 191, namely, between the first straight portion 194 and the second straight portion 195.

Each heating unit 162 is equipped with a plurality of (seven) heaters (e.g. infrared heaters) 166 extending along the transport direction of the preform 200 (hereinafter referred to simply as the transport direction) (see FIG. 4). The plurality of heaters 166 are arranged at a predetermined spacing in the vertical direction. Each heater 166 is provided to be movable in a direction orthogonal to the transport direction in FIG. 2 (i.e. in a left-right direction in the drawing). That is, each heater 166 is configured such that its distance from the preform 200 can be varied, as appropriate, in conformity with the shape or the like of the preform 200 (see FIG. 5).

The preforms 200 are sequentially transported within the transport spaces 165 while being allowed to rotate on their axes within the heating section 160 having the plurality of heating boxes 161, whereby the preforms 200 are heated by the plurality of heating units 162 to a temperature suitable for stretching. On this occasion, the heating temperatures of the heaters 166 constituting the heating unit 162 are adjusted, whereby a temperature distribution in the axial direction of the preform 200 can be imparted to the preform 200.

The heating section 160 also has a first blower 167 and first supply pipes 168, as a first supply section, for supplying cooling air to the transport spaces 165 of the heating boxes 161. Each heating box 161 is configured to be capable of cooling the surfaces of the preforms 200 with cooling air supplied from the first blower 167 to the transport space 165 via the first supply pipe 168, during heating of the preforms 200.

Concretely, an air delivery space 169 (169A, 169B, 169C) serving as a flow path for cooling air is formed outwardly of each heating box 161 on the side of the heating unit 162, namely, outwardly of the cover member 164. The air delivery space 169A is provided in correspondence with the fifth heating box 161E. The air delivery space 169B is provided to be common to the first heating box 161A and the fourth heating box 161D, while the air delivery space 169C is provided to be common to the second heating box 161B and the third heating box 161C. That is, the air delivery spaces 169 (169B, 169C) are provided between the constituent lines of the transport line 191 (between the first straight portion 194 and the second straight portion 195).

To these air delivery spaces 169, the first blower 167 is connected via the first supply pipes 168. That is, one end side of the first supply pipes 168 is connected to the first blower 167, whereas the other end side of the first supply pipes 168 branches off in three directions for connection to the air delivery spaces 169A, 169B, 169C.

Each air delivery space 169 communicates with the transport space 165 via an opening 170 provided in the wall 164a of the cover member 164 on the side of the heating unit 162. The opening 170 is provided on one end side of the wall 164a in the transport direction. The opening 170 (170A to 170E) is formed by bending a part of the wall 164a by a predetermined angle toward the transport space 165 so as to open toward the other end side of the wall 164a in the transport direction. In the present embodiment, the openings 170A, 170B of the first and second heating boxes 161A, 161B are provided, in the vicinity of the upstream ends of the walls 164a in the transport direction, so as to open toward the downstream side. The openings 170C, 170D, 170E of the third to fifth heating boxes 161C, 161D, 161E are provided, in the vicinity of the downstream ends of the walls 164a in the transport direction, so as to open toward the upstream side.

One end of a discharge pipe (discharge passage) 171 for discharging cooling air, which has cooled the preform 200 within the transport space 165, to the outside of the transport space 165 is connected to a nearly middle part of the wall 164b of each cover member 164 on the side opposite to the heating unit 162.

According to the configuration of the present embodiment described above, cooling air supplied from the first blower 167 into the air delivery spaces 169 via the first supply pipes 168 is supplied into the transport spaces 165 of the heating boxes 161 through the openings 170 to cool the surfaces of the preforms 200. As mentioned above, the opening 170 is formed by bending a part of the wall 164a by the predetermined angle. Thus, cooling air passing through the opening 170 flows into the transport space 165 along the bent part of the wall 164a. That is, an air stream heading from the one end side toward the other end side in the transport direction occurs within the transport space 165. By this action, the plurality of preforms 200 transported within the transport spaces 165 can be cooled satisfactorily.

It is preferred that the junction of the first supply pipe 168 with the air delivery space 169, and the opening 170 connecting the air delivery space 169 and the transport space 165 be provided at relatively spaced positions. If the opening 170 is provided on the one end side of the wall 164a, as stated above, it is preferred for the above junction to be provided on the other end side of the wall 164a. By so doing, cooling air can be supplied from the opening 170 to the transport space 165 at a relatively high wind pressure.

According to the configuration of the present embodiment, moreover, cooling air for supply into the transport space 165 is supplied from the back surface side of the heating unit 162 into the transport space 165, and passed through the gaps between the heaters 166 constituting the heating unit 162 to arrive at the surfaces of the preforms 200. That is, with the heating section 160 according to the present embodiment, when the preform 200 is heated to a temperature suitable for stretching, the surface of the preform 200 is cooled with cooling air, and the surface of each heater is also cooled.

The cooling air raised in temperature (i.e. warm air) by cooling the preforms 200 in the above-described manner is then discharged to the outside of the transport space 165. As mentioned above, one end of the discharge pipe 171 is connected to the nearly middle part of the wall 164b of the cover member 164 on the side opposite to the heating unit 162. Thus, the cooling air raised in temperature (i.e. warm air) by cooling the preforms 200 within the transport spaces 165 is discharged to the outsides of the transport spaces 165 through these discharge pipes 171.

The heating section 160 has the first supply section for supplying cooling air to the transport spaces 165 of the heating boxes 161, and also has a second blower 172 and second supply pipes 173, as a second supply section, for supplying warm air at a nearly constant temperature to upper spaces of the cover members 164, namely, to upper parts of the transport spaces 165. To the second blower 172, the other end side of each discharge pipe 171 is connected. The second supply pipes 173 have one end side connected to the second blower 172, and have the other end side connected to the end surfaces, on the side opposite to the exhaust portion 163, of the first heating box 161A constituting the first heating section 160a and the fifth heating box 161A constituting the second heating section 160b.

With the heating section 160 according to the present embodiment, as described above, cooling air is supplied from the air delivery spaces 169, which are provided between the constituent lines of the transport line, namely, between the first straight portion 194 and the second straight portion 195, into the transport spaces 165 via the gaps between the heaters 166. Thus, the temperature adjustment of the transport spaces, where the preforms are transported, can be performed efficiently by the relatively simple configuration.

In the present embodiment, moreover, warm air which is cooling air raised in temperature by cooling the preforms 200 in the transport spaces 165 (such warm air will hereinafter be referred to simply as "warm air") is discharged from the discharge pipes 171, and then resupplied by the second blower 172 to the upper parts of the transport spaces 165 via the second supply pipes 173. Thus, the upper parts of the transport spaces 165 are always supplied with warm air at a nearly constant temperature, regardless of climate, weather, etc.

Figure 3:
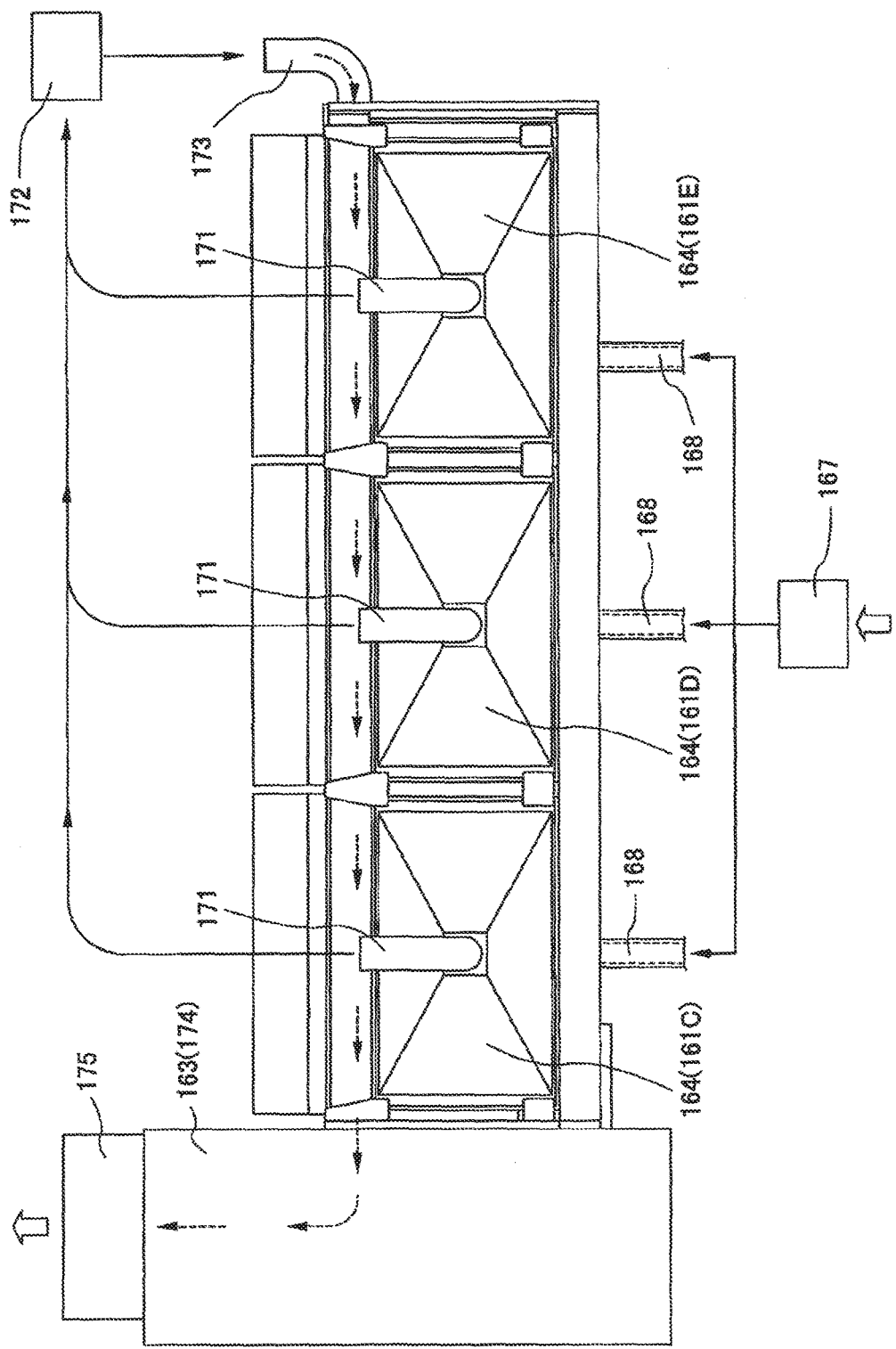
FIG. 3 is a side view showing the heating apparatus according to Embodiment 1 of the present invention.
Figure 4:
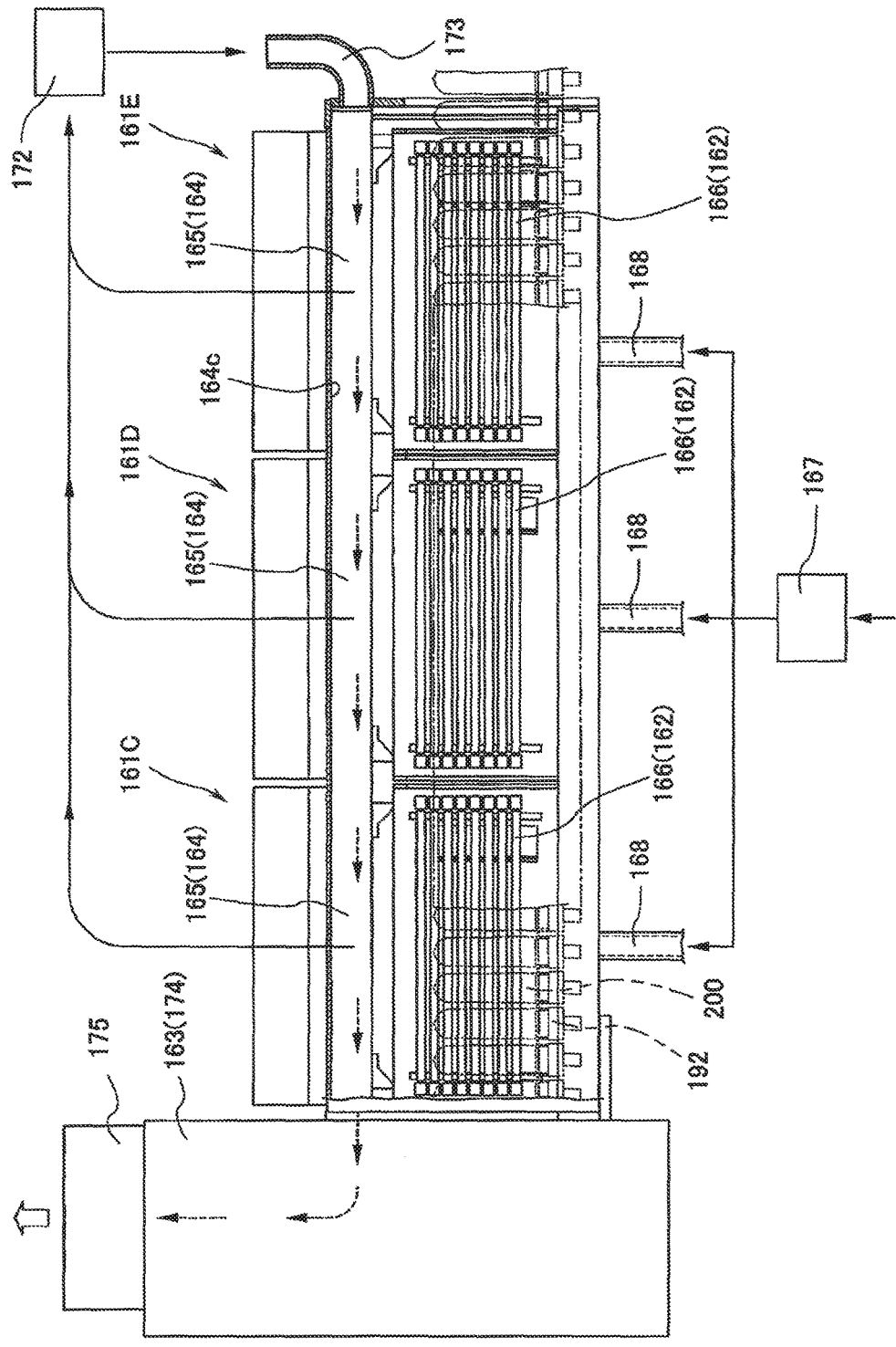
FIG. 4 is a sectional view showing the internal structure of the heating apparatus according to Embodiment 1 of the present invention.
Figure 5:
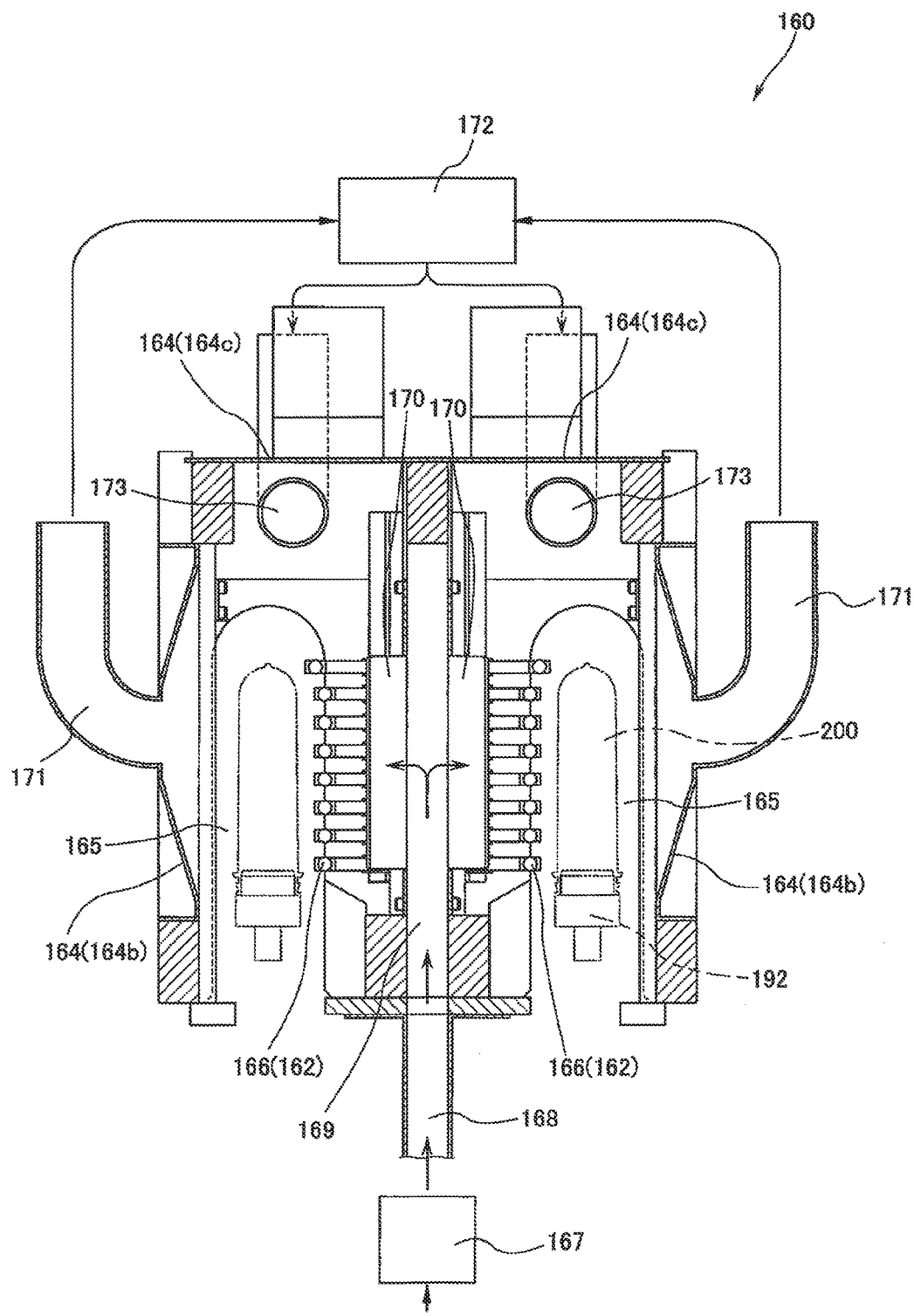
FIG. 5 is a sectional view showing the internal structure of the heating apparatus according to Embodiment 1 of the present invention.

This warm air flows along the upper surfaces 164c of the cover members 164, flows into the exhaust portion 163 provided in the curved portion 196, and is discharged to the outside, as indicated by arrows in FIGS. 3 and 4. In the present embodiment, the exhaust portion 163 forms an exhaust passage 174 opening at the top. The transport spaces 165 of the first heating section 160a and the second heating section 160b are each connected to the exhaust passage 174. A blowing fan 175 for exhaust is provided at an opening part of the exhaust passage 174. The warm air flowing from each transport space 165 into the exhaust passage 174 as mentioned above is discharged to the outside from the upper opening of the exhaust passage 174 by the blowing fan 175.

With the heating section 160 according to the present embodiment described above, the temperature adjustment of the transport spaces (internal spaces) 165, where the preforms are transported, can be performed efficiently and appropriately by the relatively simple configuration.

As noted above, the transport space 165 is formed by closing the upper part of the transport line 191 with the cover member 164. That is, an opening for discharging air inside the transport space 165 is not formed in the upper part (top surface) of the cover member 164. Thus, the temperature within the transport space 165 is easy to raise, but air raised in temperature (i.e. warm air) by cooling the preforms 200 is apt to accumulate in the upper part of the transport space 165. That is, a so-called heat reservoir is liable to occur in the upper part of the transport space 165.

Since warm air is flowed in the upper part of the transport space 165 (above the preform 200), however, the temperature within the transport space 165 is easily raised, and the heat reservoir can be eliminated. By supplying warm air along the transport line 191, in particular, the heat reservoir can be eliminated efficiently. Since the heat reservoir disappears in this manner, the preform 200 can be heated appropriately and, for example, can be appropriately provided with a temperature distribution as well.

It is to be noted that the supply of warm air to the upper part of the transport space 165 refers to the supply of air at a temperature nearly constant (warm air) regardless of climate or the like, rather than outside air changing in temperature because of climate or the like, to the upper part of the transport space 165.

By so supplying warm air into the transport space 165, variations in the temperature of the transport space 165 is suppressed, so that variations in the temperature of the preform 200 can also be inhibited. Furthermore, with the present embodiment, exhaust (warm air) discharged from inside the transport space 165 is recovered, and resupplied to the upper part of the transport space 165. Hence, the energy efficiency is further increased, and the apparatus can also be comparatively simplified.

After the preforms 200 are heated by the heating section 160, they are further transported along the transport line 191 and carried into the blow molding section 180. Concretely, the preforms 200 are carried into an inversion section 185 along the transport line 191. In the inversion section 185, the preforms 200 held in an inverted state are inverted, a predetermined number (for example, eight) of the preforms at a time, to be brought into an upright state. In this state, they are grasped by a transfer arm (not shown). Then, the predetermined number of the preforms 200 are transported by the transfer arm to blow cavity molds 181 each composed of a pair of split molds, and the preforms 200 are blow molded in the blow cavity molds 181 to form hollow containers of a desired shape.

Embodiment 2

Figure 6:
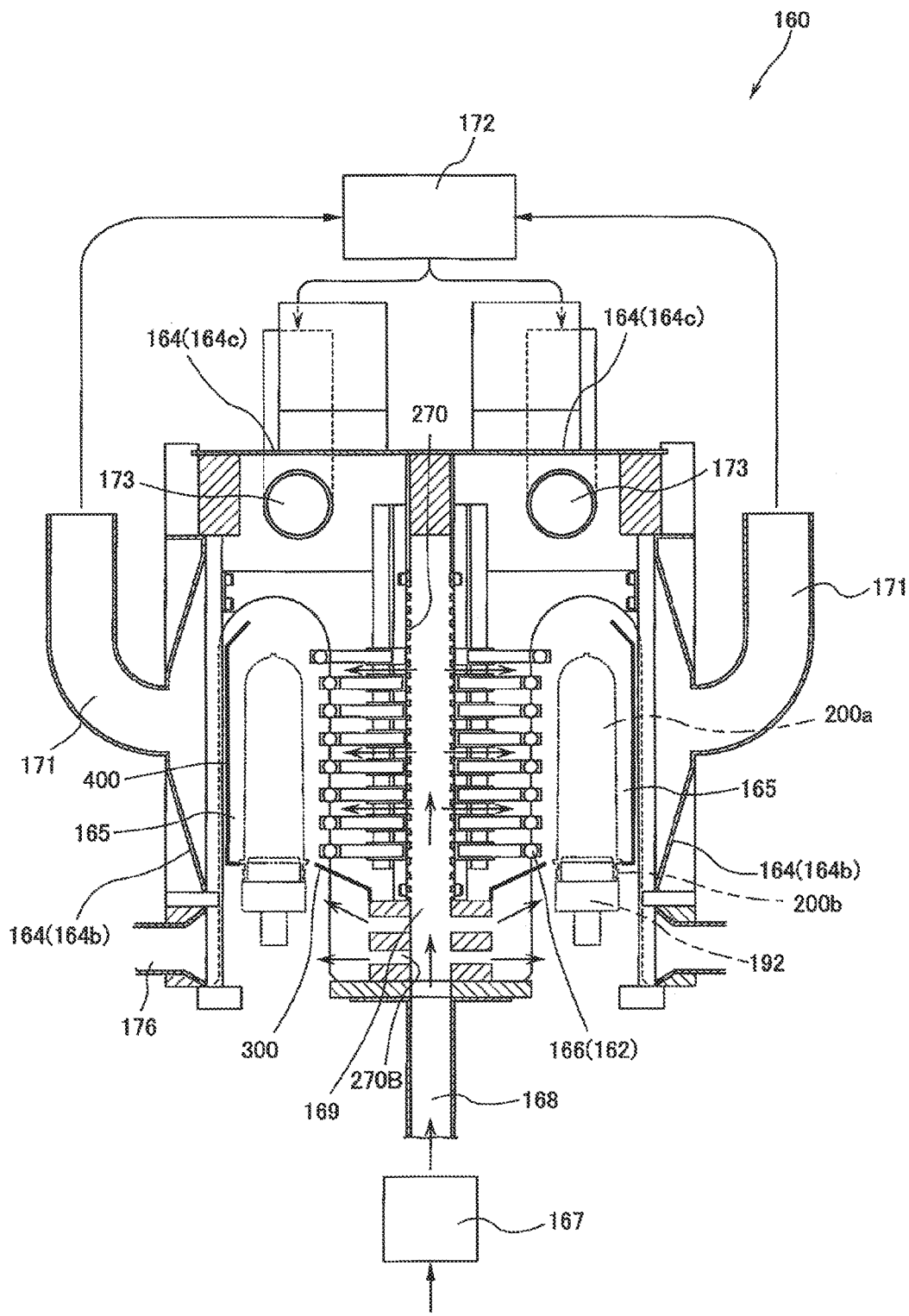
FIG. 6 is a sectional view showing the internal structure of a heating apparatus according to Embodiment 2 of the present invention.

FIG. 6 is a sectional view showing the internal structure of a heating apparatus according to Embodiment 2. The same members as those in the heating apparatus of Embodiment 1 are assigned the same numerals as those in Embodiment 1, and duplicate explanations are omitted.

A heating apparatus 160 according to the present embodiment is different from that of Embodiment 1 in a supply path for supplying cooling air toward preforms 200. A cover member 164 is provided with a first opening 270A and a second opening 270B for bringing a transport space 165 and an air delivery space 169 into communication with each other. The first opening 270A is provided at a position corresponding to a heating unit 162, while the second opening 270B is provided below the heating unit 162. From the first opening 270A, cooling air supplied mainly toward a barrel 200a of the preform 200 is introduced into the transport space 165. From the second opening 270B, cooling air supplied mainly toward a neck 200b of the preform 200 and a transport jig 192 is introduced. The shapes of the first opening 270A and the second opening 270B are not limited. The first opening 270A and the second opening 270B are each composed of, say, a plurality of through-holes 164a formed in the cover member 164.

A light shielding plate 300 for suppressing the irradiation of the neck 200b of the preform 200 with infrared rays by heaters 166 is provided within the cover member 164. To the wall of the cover member 264 on the side opposite to the heating unit 162, a discharge pipe 171 is connected opposite the first opening 270A, and a second discharge pipe (second discharge passage) 176 is connected opposite the second opening 270B. Further, the wall of the cover member 164 on the side opposite to the heating unit 162 is provided with a reflection plate 400 along the surface of the wall.

In this configuration, cooling air introduced into the transport space 165 through the first opening 270A is mainly supplied to the barrel of the preform 200. Then, the cooling air (warm air) passes through the spaces in the up-down or left-right direction of the reflection plate 400, and is discharged to the outside mainly from the discharge pipe 171. On the other hand, cooling air introduced through the second opening 270B is supplied mainly to the neck 200b of the preform 20, and then discharged to the outside mainly from the second discharge pipe 176.

With the heating section 160 according to the present embodiment, cooling air is supplied from the air delivery space 169 into the transport space 165 via the first and second openings 270A, 270B. Thus, a relatively simple configuration makes it possible to efficiently make the temperature adjustment of the transport space where the preform is transported. Furthermore, the light shielding plate 300 is installed within the transport space 165 so that the neck 200b of the preform 200 is not heated by irradiation with infrared rays, and the reflection plate 400 is installed so that the barrel 200a is effectively heated. Because of these features, the preform 200 can be heated more appropriately, with the temperature elevation of the neck 200b and transport jigs 192, namely, the deformation of the neck 200b, being inhibited.

The embodiments of the present invention have been described as above. However, the present invention is not limited to the foregoing embodiments.

In the above-described embodiments, for example, the second supply section is configured to recover warm air discharged from the transport space 165, and resupply this warm air to the upper part of the transport space 165, but the present invention is not limited to this configuration. The second supply section may be configured not to recover warm air from the transport space 165, but to supply warm air, which is outside air heated to a predetermined temperature, to the upper part of the transport space 165. In the above embodiments, moreover, the second supply section supplies warm air to the upper part of the transport space 165 along the transport line 191, but the direction of supply of warm air is not limited, and may be, for example, a direction orthogonal to the transport line 191.

In the above embodiments, moreover, warm air supplied from the one end side of the transport space 165 is discharged to the outside from the exhaust portion 163 provided on the other end side of the transport space 165. However, the discharge route for warm air is not limited.

Besides, the heating section 160 need not necessarily be equipped with the second supply section. In other words, warm air need not necessarily be supplied to the upper part of the transport space 165.

EXPLANATIONS OF LETTERS OR NUMERALS

100 Injection molding apparatus
120 Injection molding section
121 Mold clamping mechanism
140 Cooling section
160 Heating section
161 Heating box
162 Heating unit
163 Exhaust portion
164 Cover member
165 Transport space
166 Heater
167 First blower
168 First supply pipe
169 Air delivery space
170 Opening
171 Discharge pipe (discharge passage)
172 Second blower
173 Second supply pipe
174 Exhaust passage
175 Blowing fan
176 Second discharge pipe (second discharge passage)
180 Blow molding section
181 Blow cavity mold
185 Inversion section
190 Transport section
191 Transport line
192 Transport jig
193 Sprocket
194 First straight portion
195 Second straight portion
196 Curved portion
200 Preform
270A First opening
270B Second opening
300 Light shielding plate
400 Reflection plate

The invention claimed is:

1. A preform heating apparatus for heating preforms transported on a transport line, wherein two of the transport lines are arranged adjacently and in parallel,
the preform heating apparatus comprising:
cover members provided to close upper parts of the transport lines;
heating units provided within the cover members and each having heaters for heating the preforms; and
a first supply section for supplying cooling air for cooling the preforms into the cover members,
wherein the heating units are each provided within each of the cover members on a side between the transport lines, and
the first supply section introduces cooling air from air delivery spaces, which are provided between the transport lines, through gaps between the heaters into the cover members to supply the cooling air toward the preforms.

2. The preform heating apparatus according to claim 1, wherein
the cover member is provided with a first opening which is provided opposite the heaters and into which cooling air heading for a barrel of the preform is introduced, and a second opening which is provided independently of the first opening and into which cooling air heading for a neck of the preform is introduced.

3. The preform heating apparatus according to claim 2, wherein
a discharge passage is provided opposite the first opening, and
a second discharge passage independent of the discharge passage is provided opposite the second opening.

4. The preform heating apparatus according to claim 1, further comprising
a second supply section for supplying warm air to upper spaces of the cover members.

5. The preform heating apparatus according to claim 4, wherein
the second supply section recovers the cooling air supplied by the first supply section into the cover members, and resupplies the cooling air to the upper spaces of the cover members.

6. The preform heating apparatus according to claim 4, wherein
the second supply section supplies the warm air into the cover members along the transport lines.

7. The preform heating apparatus according to claim 5, wherein
the second supply section supplies the warm air into the cover members along the transport lines.

8. The preform heating apparatus according to claim 4, wherein
the cover member is supplied with the warm air from one end side of the cover member,
the warm air is discharged from another end side of the cover member, and
an exhaust portion having an opening at a top thereof and discharging the warm air, which has been discharged from the cover member, to an outside through the opening is connected to the other end side of the cover member.

9. The preform heating apparatus according to claim 5, wherein
the cover member is supplied with the warm air from one end side of the cover member,
the warm air is discharged from another end side of the cover member, and
an exhaust portion having an opening at a top thereof and discharging the warm air, which has been discharged from the cover member, to an outside through the opening is connected to the other end side of the cover member.

10. The preform heating apparatus according to claim 6, wherein
the cover member is supplied with the warm air from one end side of the cover member,
the warm air is discharged from another end side of the cover member, and
an exhaust portion having an opening at a top thereof and discharging the warm air, which has been discharged from the cover member, to an outside through the opening is connected to the other end side of the cover member.

11. The preform heating apparatus according to claim 7, wherein
the cover member is supplied with the warm air from one end side of the cover member,
the warm air is discharged from another end side of the cover member, and
an exhaust portion having an opening at a top thereof and discharging the warm air, which has been discharged from the cover member, to an outside through the opening is connected to the other end side of the cover member.

* * * * *